United States Patent

Bailey et al.

[15] 3,641,526

[45] Feb. 8, 1972

[54] INTRA-RECORD RESYNCHRONIZATION

[72] Inventors: David L. Bailey, Longmont; Harry C. Hinz, Jr., Arvada, both of Colo.

[73] Assignee: International Business Machines Corporation, Armonk, N.Y.

[22] Filed: Dec. 29, 1969

[21] Appl. No.: 888,595

[52] U.S. Cl. ....................340/174.1 A

[51] Int. Cl. ....................G11b 5/02

[58] Field of Search..............340/174.1 R, 174.1 A, 174.1 G, 340/174.1 H, 174.1 B; 179/100.2 MI, 100.2 S

[56] References Cited

UNITED STATES PATENTS

| | | | |
|---|---|---|---|
| 3,382,492 | 5/1968 | Santana | 340/174.1 G |
| 3,039,084 | 6/1962 | Curtis | 340/174.1 H |
| 2,904,777 | 9/1959 | Cox et al. | 340/174.1 H |
| 3,467,995 | 9/1969 | Poumakis | 340/174.1 H |
| 3,418,585 | 12/1968 | Harnett | 340/174.1 A |
| 3,237,176 | 2/1966 | Jenkins | 340/174.1 |
| 3,427,605 | 2/1969 | Gabor | 340/174.1 |

*Primary Examiner*—Stanley M. Urynowicz, Jr.
*Assistant Examiner*—Vincent P. Canney
*Attorney*—Hanifin and Jancin and Herbert F. Somermeyer

[57] ABSTRACT

A self-clocking recording system using signals representative of data having predetermined one-half wavelength sequences including short and long one-half wavelengths. Resynchronization (resync) and position indicating signals are recorded among data signals in each track for indicating track position with respect to other tracks. Frequency synchronization utilizes recorded data signals. The position-indicating resync signal is limited in length to a small number of cycles of record state changes which primarily use the longer one-half wavelengths used to record data. In one recording scheme, two long wavelengths of the same polarity indicate position in the tracks. In another, two successive long one-half wavelengths indicate track position and data phase relationships. In yet other recording schemes, a unique sequence of two one-half wavelengths or a sequence of three long one-half wavelengths indicates data phase and track positional information.

19 Claims, 7 Drawing Figures

INVENTORS
DAVID L. BAILEY
HARRY C. HINZ, JR.

BY [signature]

ATTORNEY

FIG. 4
PE/FM PATTERN DETECTOR
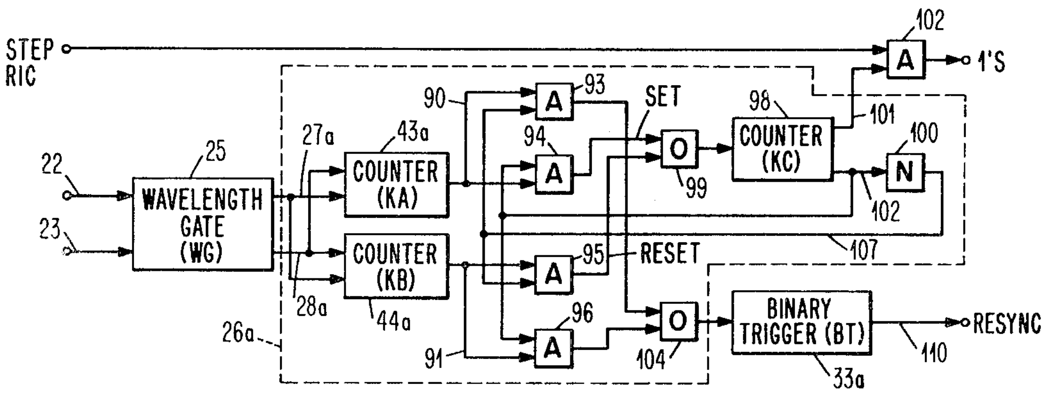
FIG. 5
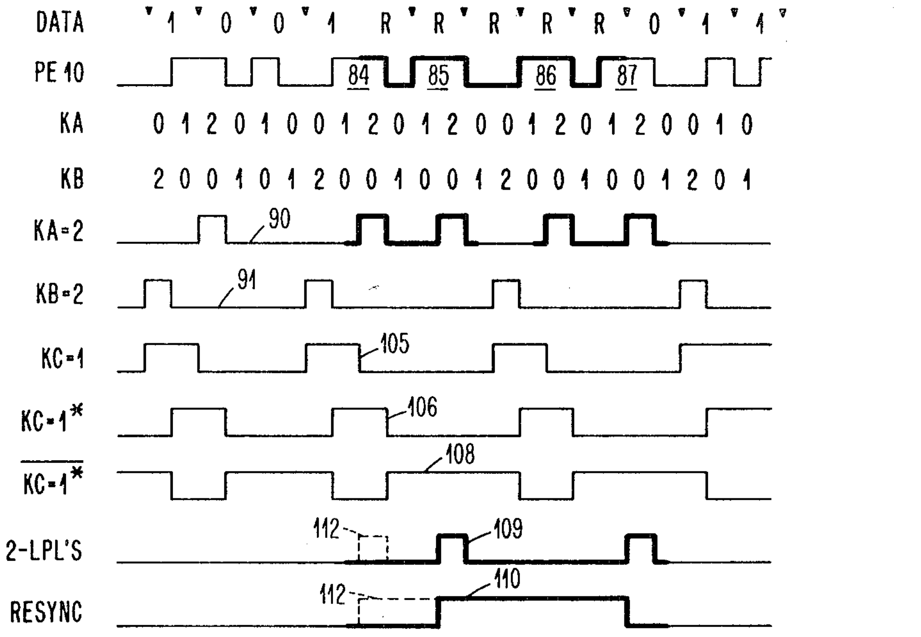
FIG. 7
| | | | | | | | | | | | | | | | | | | | | | | |
|---|---|---|---|---|---|---|---|---|---|---|---|---|---|---|---|---|---|---|---|---|---|---|
| 1 | 2 | 3 | 4 | 5 | 6 | 7 | 0 | 1 | 2 | 3 | 4 | 5 | 6 | 7 | 0 | 0 | 1 | 2 | 3 | 4 | 5 | 6 | ROC |
| 1 | 2 | 3 | 4 | 5 | 6 | 7 | 0 | 1 | 2 | 3 | R | R | R | R | 0 | 1 | 2 | 3 | 4 | 5 | 6 | 7 | RIC-3 |
| 1 | 2 | 3 | 4 | 5 | 6 | 7 | 0 | 1 | 2 | 3 | R | R | R | R | 0 | 1 | 2 | 3 | 4 | 5 | 6 | 7 | RIC-2 |
| 4 | 5 | 6 | 7 | 0 | 1 | 2 | 3 | R | R | R | R | 0 | 1 | 2 | 3 | 4 | 5 | 6 | 7 | 0 | 1 | 2 | RIC-1 |
| X | X | X | X | X | X | X | X | X | X | X | X | R | R | R | R | 0 | 1 | 2 | 3 | 4 | 5 | 6 | RIC-0 |
| | | | MAX LEAD | | | | | | | | | | | | | | | MAX LAG | | | | | RESYNC PERIOD |

INTRA-RECORD RESYNCHRONIZATION

BACKGROUND OF THE INVENTION

This invention relates to a digital signal recording systems, particularly those utilizing moving media and apparatus and methods for resynchronizing recording systems with resynchronization signals interleaved among data signals recorded on the media.

Signal recovery circuits are synchronized at the onset of a block of data signals. This synchronization is effected with a burst of recorded synchronization signals commonly referred to at one end as beginnings burst or preamble and, at the other end of the data block, as ends burst or postamble. Blocks of data signals are bracketed by such signals. Errors occur when the record tape or other media separates from the reading (sensing) transducer such that no signal or phase shift error is induced in the sensing circuit. Also, a crease or other flaw on the record media may cause a temporary loss of signals. The temporary loss of more than one of these signals in present day systems prevents successful recovery of signals within that block of recorded data signals. Such loss of signals is referred to as the binary erasure mode (dead track).

The construction and operation of recording systems (especially magnetic tape-recording systems) is a compromise between reliability and increasing data throughput. Users of magnetic tape-recording systems have often sacrificed data throughput in order to minimize the exposure to multiple dead track errors. The reduction in these errors for a given amount of data recorded on a magnetic tape has been accomplished by dividing the data recorded on the tape into small blocks of recorded signals, In present day tape systems, a minimum spacing is usually provided between successive blocks of recorded data. Therefore, with smaller blocks of recorded signals, the throughput of the system is not only decreased; but also the amount of tape available for recording signals is reduced. This selection increases the cost of operating a record system.

In high-density recording systems, such as those recording more than 1,000 bits per lineal inch on a magnetic tape, it is a practical necessity that signal recovery circuits for each track on the media be self-clocking. That is, during the recovery of signals from the tape, the signal recovery circuits operate at a frequency derived from the signals recovered from the tape. The reason for this self-clocking arrangement is that each cell which records a bit of data in such a high-density recording system is extremely short along the length of the tape or other media. Without self-clocking, data recorded at the higher densities could not be reliably recovered. For successful self-clocking, signals recorded on the media should be such that the readback system is synchronized during a very short distance of travel of the record media. To facilitate such synchronization, it is desirable to have predetermined signal state changes occur in the recording at least once during each short length of media. This synchronization can be accomplished by inserting synchronizing state changes between small sets of data signals or the use of data signals in a storage code having state changes during each short interval. The latter is easily accomplished by a permutation code of selected characteristics. The characteristics of such synchronizing state changes is that the phase and the frequency of the recovery circuits can be maintained, but the position of the state changes on the track are insufficient to indicate to the recovery circuit what information is indicated by the various state changes. Therefore, once a recovery circuit has lost its signal or phase, there must be provided some means for it to determine what information state changes recorded in a given track represent. Also, in parallel recorded multitrack systems, the spatial relationship between the various tracks must be determined.

The problems cited above are caused by present day recording systems having no facile method of resynchronization within a block of data signals after loss of a signal from a record track has occurred. The recording system must continue in a degraded mode of operation (i.e., without the benefit of data signals from a given track) throughout the remainder of the record completely reread. Such degraded operation is dependent upon error correction capabilities of the system. It is desirable that recording systems be able to resynchronize and rephase while reading data from a record media. Such facility should be extendable to all types of recording schemes such that, irrespective of the recording scheme selected, throughput of the record system may be enhanced.

As recording densities are increased, the amplitude of the readback signal is often decreased. Accordingly, as the density is increased, the probability of losing signal from a given track is increased. Therefore, it is desirable that a given track be capable of being resynced and requeued into the recovery system at a plurality of positions along the track length. This capability could also enhance recovery of signals to such an extent that there would be an update in place (i.e., selective alteration of the record within a block of signals) as opposed to rewriting a complete block of signals each time only one or two signals are desired to be changed. Also, it is possible that the use of interblock gaps (IBG's) so widely used in tape recording systems be reduced in number or eliminated.

Some prior intrarecord synchronization has been attempted in a low-density system. An intrarecord gap, having an extended interval between successive recorded state changes, was used to indicate position of the signals in the given records. This gap was substantially longer than any one-half wavelength used in recording data signals. However, in high-density recording systems, the interposition of such a gap causes frequency phase perturbations in the recovery system such that several cells of recorded data may not be successfully recoverable due to such induced perturbations. Therefore, it is highly desirable in high-density systems that any recorded resynchronization or position indicating signal be limited in frequency bandwidth to the data signal bandwidth.

Also, in the higher density recording systems it is desired to have a plurality of such synchronization and position indicating in each record. The length of such signals should be kept minimal. For example, it is known that a recovery circuit associated with a record track can be synchronized by a burst of signals, such as those found in the preamble and postamble portions of a block of data. Such burst of signals is a repeated pattern of synchronizing signals which are capable of frequency synchronizing recovery circuits and indicating position on the track to a recovery circuit. These are necessary to initially synchronize the recovery circuit to the record media recorded signals. However, if such burst of signals were repeatedly interleaved among data signals, the recording efficiency of the system is reduced. This, of course, reduces the throughput which, in a high-density recording scheme, is to be avoided. Therefore, it is desired that the resynchronization and position indicating signals be inserted with a minimum length of tape required and, yet, provide reliable and facile detection of such signals.

SUMMARY OF THE INVENTION

It is an object of the present invention to provide an improved recording system capable of resynchronizing a dead track while reading data signals, wherein a resynchronization (resync) position indicating signal requires but a very small portion of media surface. In connection with this object, the energy content of such a resync signal is maximized.

One feature of the present invention is a resync signal having a unique combination of long-duration one-half wavelengths, one of which occurs partially in a record cell representing data and another which represents position on a given track. This resynchronization pattern can be nonrepeated, but is preferably symmetrically detectable such that resynchronization can occur in either direction of reading the signals from the media. It is another feature to provide a unique position indicating signal occupying no more than two cycles of state transitions (i.e., no more than four state changes on the record media). The long-duration one-half wavelengths of such resynchronization signals are within the frequency bandwidth of the recorded data.

Another feature of the invention is a readback circuit which utilizes data signals from a dead track for frequency synchronization of the recovery circuits in combination with a resynchronization signal for indicating unique position on the track. This combination recalibrates signals read from the track for successful recovery of data signals and requeues the recovered signals into a deskewing apparatus (SKB) in the multitrack recording system.

Another feature is the utilization of dual one-half wavelength patterns for uniquely indicating position in a record track. Another feature is the utilization of a predetermined sequence of longer duration one-half wavelengths of the data frequency bandwidth for indicating position on the track and for resynchronizing the track recovery system to enable successful detection of data signals.

The present invention can be practiced with various recording schemes. For example, in PE (phase encoding) and FM (double frequency recording), recorded data appears as a succession of short and long-duration one-half wavelengths. Data recording is characterized in that successive ones of the longer wavelengths are always of alternating polarity. In accordance with practicing the present invention with the PE and FM recording schemes, a succession of two long wavelengths having the same polarity indicates a unique position on the record track. The second occurring like polarity long wavelength indicates track position. Successive ones of like polarity long one-half wavelengths can be of either polarity. In one pattern, in reading in one direction, the polarity may be of a first polarity; while reading in the reverse direction, the polarity may be of the opposite polarity. In a preferred form, the unique one-half wavelength pattern consists of a pair of two one-half wavelengths, either of opposite or same polarities. Data signals bracketing the resync signal alter the polarities for minimizing media extent required for the resync signal.

The invention is also usable in modified phase encoding termed MZE and MFE, wherein a succession of long-duration wavelengths which are not found in the data patterns are used for resync. In these latter instances, a binary one recording brackets the resync pattern such that after detection of the resync pattern, a binary one is always read out. This binary one indicates the proper data phase relationship of the system. In MFE, there are short, medium, and long duration one-half wavelengths. The preferred wavelength pattern is medium-long-medium-long or long-medium-long-medium sequence of one-half wavelengths. In PE/FM and MFE, the resync signal comprises a once repeated pattern of like polarity long duration one-half wavelengths to provide a unique sequence of long one-half wavelengths.

Synced NRZI may also use the present invention, wherein a predetermined data pattern brackets the omission of a clock pulse to generate three successively occurring long-duration one-half wavelengths which uniquely indicate position and data phase. The polarity reversals can be of any direction.

Other recording schemes not mentioned herein can successfully use the present invention by following the principles taught above.

The foregoing and other objects, features, and advantages of the invention will be apparent from the following more particular description of preferred embodiments of the invention, as illustrated in the accompanying drawings.

BRIEF DESCRIPTION OF THE DRAWINGS

FIG. 4 shows a simplified pattern detector usable either with phase encoded or frequency encoded data recording, and which may be incorporated into the FIG. 1 illustrated embodiment;

FIG. 5 is a set of idealized waveforms used to illustrate the operation of the FIG. 4 pattern detector;

FIG. 7 is a numerical presentation of requeuing of a dead track into a deskewing apparatus such that a data track which has been dead tracked can again successfully supply signals into a multitrack signal recovery system.

DETAILED DESCRIPTION OF THE DRAWINGS

Figure 1:
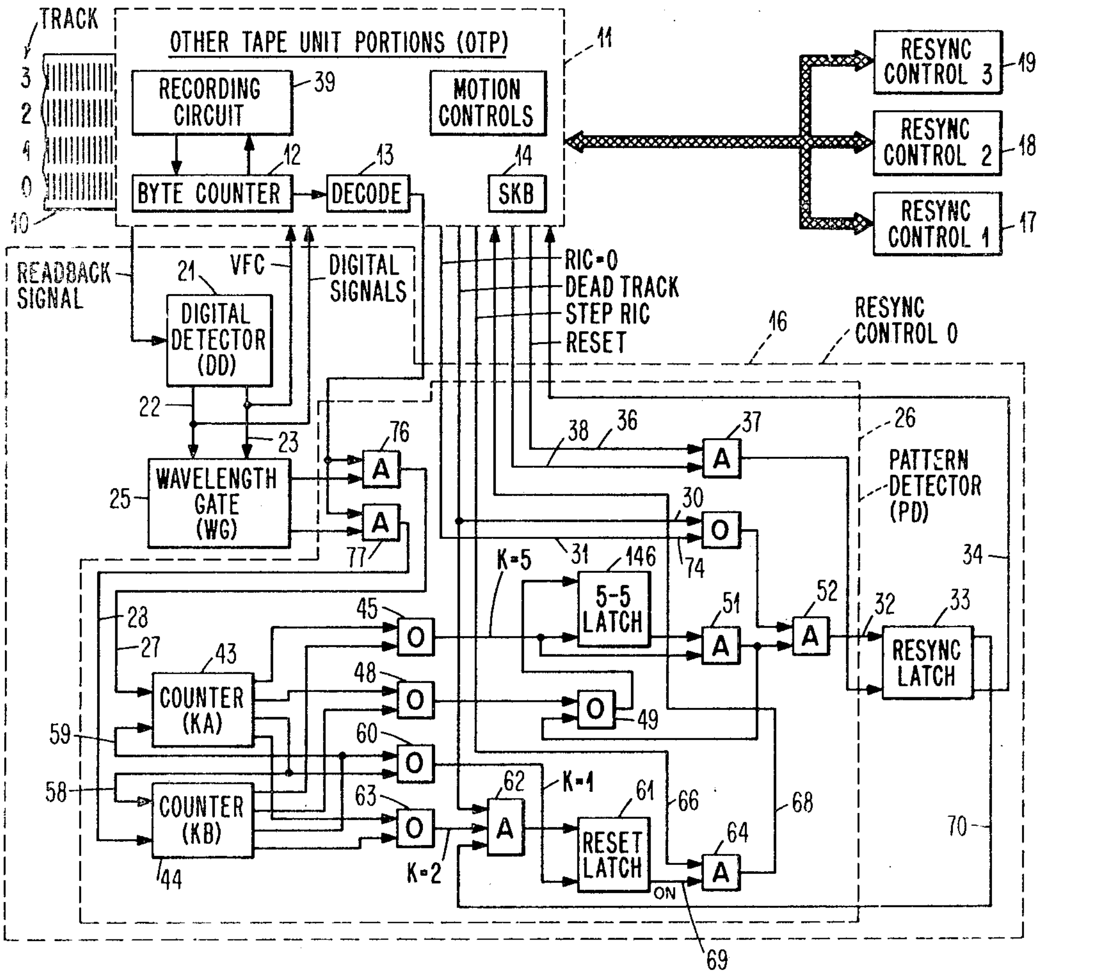
FIG. 1 is a simplified, schematic presentation of an illustrative embodiment of the present invention as practiced with a multitrack recording system having deskewing apparatus with a byte counter for carrying the length of recorded data signals between successive resynchronization signals.

With more particular reference now to the drawings, like numerals indicate like parts or structural features in the various diagrams. The FIG. 1 illustrated record system is operatively associated with magnetic tape media 10 for recording and reproducing signals with respect thereto. Media 10 has four tracks for receiving and supplying recorded signals. Since the major portion of a tape record system is not directly related to the successful practice of the invention, such portions are included in "other tape unit portions" 11, hereinafter referred to as OTP 11. In this record system, a set of signals recorded on media 10 and extending crosswise of the tape is defined as one byte of signals. In a practical embodiment, such byte of signals may be staggered due to variations in transducer construction and the like. Within OTP 11, byte counter 12 is connected to decoder 13. Byte counter 12 and decoder 13 will be more fully explained later on. Also included in OTP 11 is an electronic deskewing apparatus, labeled SKB 14. SKB 14 is constructed in accordance with the teachings of the Floros U.S. Pat. No. 2,921,296, wherein signals received from tracks on media 10 are respectively counted by four read-in counters (RIC) (not shown), the counters being incremented or decremented once for each signal read from the respective tracks. When all of the RIC's have stepped from a given numerical state (for example, from state 5), then a readout counter (ROC)(also not shown) effects a readout of SKB 14 to utilization means within OTP 11. Such utilization means may be a communication channel which is connected to a CPU (Central Processing Unit). The modulus of the RIC's is equal to the ROC modulus. The functions of OTP 11 are similar to the many tape control units, control units, tape adapter units presently on the market and which have been described in literature and patents.

The practice of the present invention in FIG. 1 is illustrated by resync controls 16, 17, 18, and 19, respectively, for tracks 0 through 3. Since each of the resync controls is identical, only the track 0 control is shown in simplified detail. Detector 21 (DD–21) receives readback signals from OTP 11 and converts same into digital readback signals and clock (VFC) signals. Data detector 21 is a typical, self-clocking signal detector for one channel of data signals. Such digital signals are representative of the readback signal. The readback signal is the differential of the recording signals shown in FIG. 2. The data represented thereby is detected in OTP 11. The VFC signals define the bit positions or cells on the respective tracks in media 10. In OTP 11, the digital and VFC signals are compared in a known manner to generate digital data signals for transmittal to SKB 14. This action is explained later. In SKB 14, such data signals are deskewed with respect to signals from other tracks to form a byte of signals which are then transferred to the utilization means. The VFC signals are supplied over line 23 to OTP 11 for synchronizing operation of detector circuits therein.

Each time SKB 14 supplies one byte of signals to the utilization means, byte counter 12 is altered by unity for tallying the number of deskewed bytes. In accordance with one aspect of the present invention, there are a predetermined number of bytes between successive ones of the later described resync signals. The tally of deskewed bytes in counter 12 is used to predict the occurrence of a resync signal, thereby increasing the reliability of detection of such a resync signal.

Digital signals on line 22 and VFC signals on line 23 are also supplied to wavelength gate 25 (WG–25). WG 25 transfers signals on lines 22 and 23 to pattern detector 26 (PD 26) for detection of the resync pattern. WG 25 is jointly responsive to the digital and VFC signals to supply signals respectively over lines 27 or 28, depending upon the polarity of the digital signal. That is, when a digital signal on line 22 is negative, VFC signals or pulses on line 23 are supplied over line 27. Correspondingly, when such digital signals are positive, VFC signals are supplied over line 28. In this manner, the number of VFC signals passed in one succession over either line 27 or 28 is representative of the duration of each one-half wavelength in the digital signal (i.e., the interval between two successive signal state changes). Circuitry usable as WG 25 is described by D. L. Bailey et al. in the IBM Technical Disclosure Bulletin, Dec. 1969, on pages 1,015 through 1,017.

PD 26 is responsive to the signals on lines 27 and 28 to determine a sequence of one-half wavelengths indicative of a resync pattern on a given track. Upon detection of such a resync pattern in conjunction with a dead track indication received over line 30, from OTP 11, an initial resync signal supplied over line 32 sets resync latch 33 to the active condition. Resync latch 33 being active supplies an indicating signal over line 34 to OTP 11 for momentarily inhibiting transfer of data from SKB 14.

As mentioned before, OTP 11 includes a self-clocking readback system. Usually, a self-clocking readback system has "-dead-tracking capabilities." In this mode, signals from track 0, media 10 for example, may have been temporarily lost. OTP 11 senses the temporary loss of signals and inhibits transfer of any subsequently received signals from track 0. The operation of OTP 11 then changes to a degraded mode wherein signals from other tracks which have never lost their signal amplitude or phase are transferred through SKB 14 to the utilization means without the track 0 signals. Error detection and correction circuitry can be called into play for inserting or replacing the signals lost from track 0. Such degraded mode of operation is indicated respectively by a dead track signal for each of the respective tracks that are dead. Even though a track may be supplying signals after a temporary loss of signal amplitude or loss of phase, such signals cannot be used for data detection by DD 21 because the clock-to-data state change, and the data skew relationship is not known. In practicing the present invention, the clock circuits in DD–21 may be synchronized by restored signals from the dead track, even though data is not being recovered following synchronization to a VFC signal of another channel. At the first indication of a restored signal during resync, as described herein, synchronization of the clock is switched from an adjacent channel to the readback signal of the just resynchronized channel or track. In any event, it is assumed that the frequency of the VFC signal has been established at the time of encountering the resync signal. The significance of this statement will become more apparent from a continued reading of the specification. The purpose of the resync is to reestablish the phase relationship and define the exact position of a dead track on media 10 with respect to other tracks. This action is necessary for successful detection in OTP 11 and deskewing signals in SKB 14.

OTP 11 determines the end of the resync pattern and supplies a reset signal over line 36. AND-circuit 37 is jointly responsive to the reset signal and to ROC having a readout state of 2 ($ROC$=2), as indicated on line 38, to reset resync latch 33. This removes the resync indicating signal on line 34 and restores normal data processing operations within OTP 11. $ROC$=2 in the illustrated embodiment indicates that the third data byte after resync has been deskewed.

Figure 2:
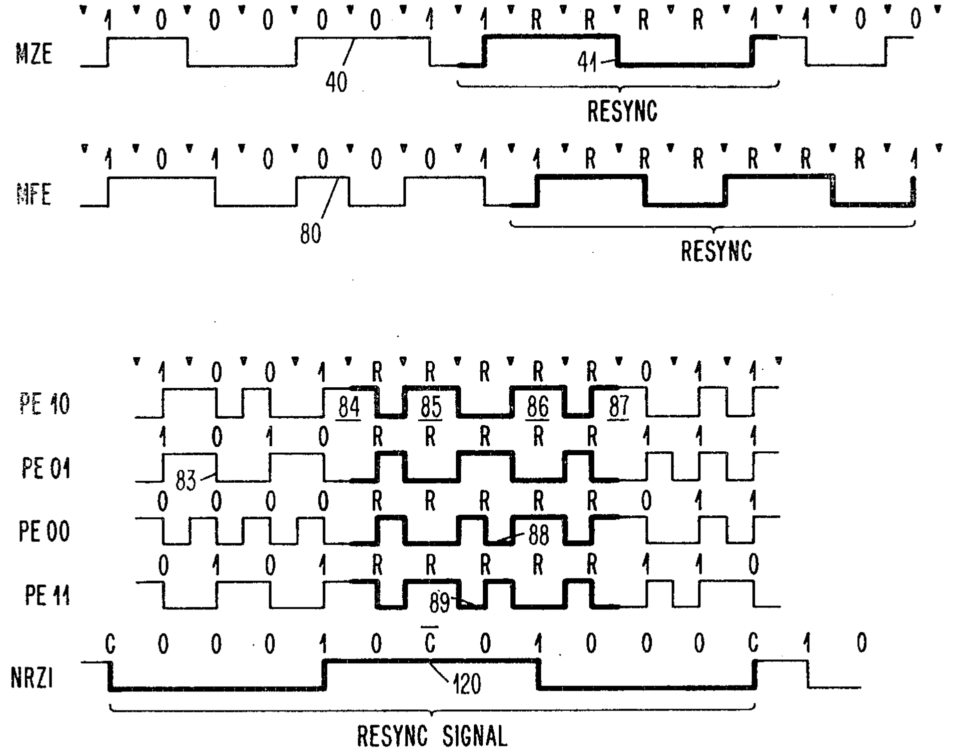
FIG. 2 is a set of idealized readback signal waveforms used to illustrate how the invention can be practiced with the various recording schemes as utilized in the FIG. 1 illustrative embodiment.

OTP 11 also records the digital and resync signals as shown in FIG. 2. Sequence control for recording digital signals is well known and is not described in detail for that reason. OTP 11 includes recording circuit 39 which is operative to record the later-described recording signals on media 10. In recording the later-described resync signals, recording circuits 39 are responsive to byte counter 12 counting through all 0's to temporarily stop recording data signals for interleaving a recorded resync signal. The resync signal recording waveforms are easily constructed using known digital recording techniques used to record data signals. Such details are dispensed with herein for the sake of brevity.

OTP 11 also includes motion controls for selectively transporting media 10 past a set of magnetic transducers (not shown).

As described to this point, the FIG. 1 illustrated embodiment can be used with several recording schemes for successful intrarecord resynchronization. The detailed illustration of PD 26 in FIG. 1 is designed to work with MZE recording, such as the system described in U.S. Pat. No. 3,217,183. In recording data in the MZE recording scheme, data is represented by one-half wavelengths of four different durations. A state change within a cell represents a "1," while no state change represents a "O." The one-half wavelengths are selected for self-clocking purposes. By definition, if each cell in the record media track capable of recording one bit of data is represented by the numeral 2, making one-half the length of the cell a media unit length represented by numeral 1; then the permitted one-half wavelengths durations in MZE are represented by 2, 3, 4, and 5 units. Because of the rules established in MZE recording, which rules were established for obtaining an optimum performance, two successive alternating polarity one-half wavelengths of 5 units are not permitted. The present invention takes advantage of this rule to provide a resync pattern within MZE recording consisting of two successive 5 unit one-half wavelengths which are bounded or bracketed by recorded binary 1's. The binary 1's record data phase information.

In FIG. 2, MZE digital recording signal 40 includes resync pattern 41 occupying six recording cells. The data represented by signal 40 is set forth immediately adjacent the signal representation with the cell boundaries being indicated by carets immediately above the signal. Upon detection of the 5—5 unit one-half wavelength pattern 41, resync position is indicated with the next occurring binary 1 state change. The bracketing recorded 1's to the resync signal R establish the unique phase relationship necessary for detecting data and also establishes track position within media 10 such that the track may be requeued in SKB 14. For example, the signal from the first record cell traversed after either bracketing 1's in the resync pattern 41 is to be loaded into SKB 14, represented by the RIC count of 0. Since all of the tracks will have an RIC count of 0 with their respective resync patterns, a byte of data on the media 10 is uniquely identified by the resync pattern 41 The illustrated resync pattern requires but 1½ cycles of state changes.

Returning now to FIG. 1, detection of resync pattern 41 and the control of OTP 11 by PD 26 is described. It is remembered that the readback signal supplied to DD 21 is the differentiated signal of the record signal 40. In a first aspect of the invention, PD 26 is always looking for the 5—5 one-half wavelength pattern. Counters 43 and 44 receive the wavelength counting signals over lines 27 and 28, respectively. When either counter detects a count of 5 VFC signals before being reset by a state change, as will be later described, it supplies a $K$=5 signal through OR circuit 45 to set 5—5 binary trigger or latch 46. This latch being set indicates that one 5 unit one-half wavelength has been counted by one of the counters 43 or 44. This also corresponds to counting a 5 unit one-half wavelength in data. At this time, it is not known which is happening. If either counter counts to a number other than 5, that is, 2, 3, or 4, upon being reset a signal is supplied through OR-circuit 48, thence OR-circuit 49 resetting binary trigger 46. This action indicates that the first 5 unit one-half wavelength occurred within data. On the other hand, if either of the counters next counts to $K$=5, a second occurring $K$=5 signal is supplied through OR-circuit 45 to sample AND-circuit 51. AND-circuit 51 is enabled by binary trigger 46 being set to its active condition. The $K$=5 signal being passed by AND-circuit 51 indicates that a resync pattern has been detected. This signal is supplied to AND-circuit 52 which has been enabled by a dead track signal received over line 30 from OTP 11. In the event that track 0 was active, the resync pattern should be detected when RIC for track 0 equals 0. At this time, an AND circuit enabling signal, indicating $RIC$=0, supplied over line 31 opens AND-circuit 52 to supply the resync pattern indicating signal to set resync latch 33. This, of course, initiates resync action within OTP 11, as previously referred to.

Figure 3:
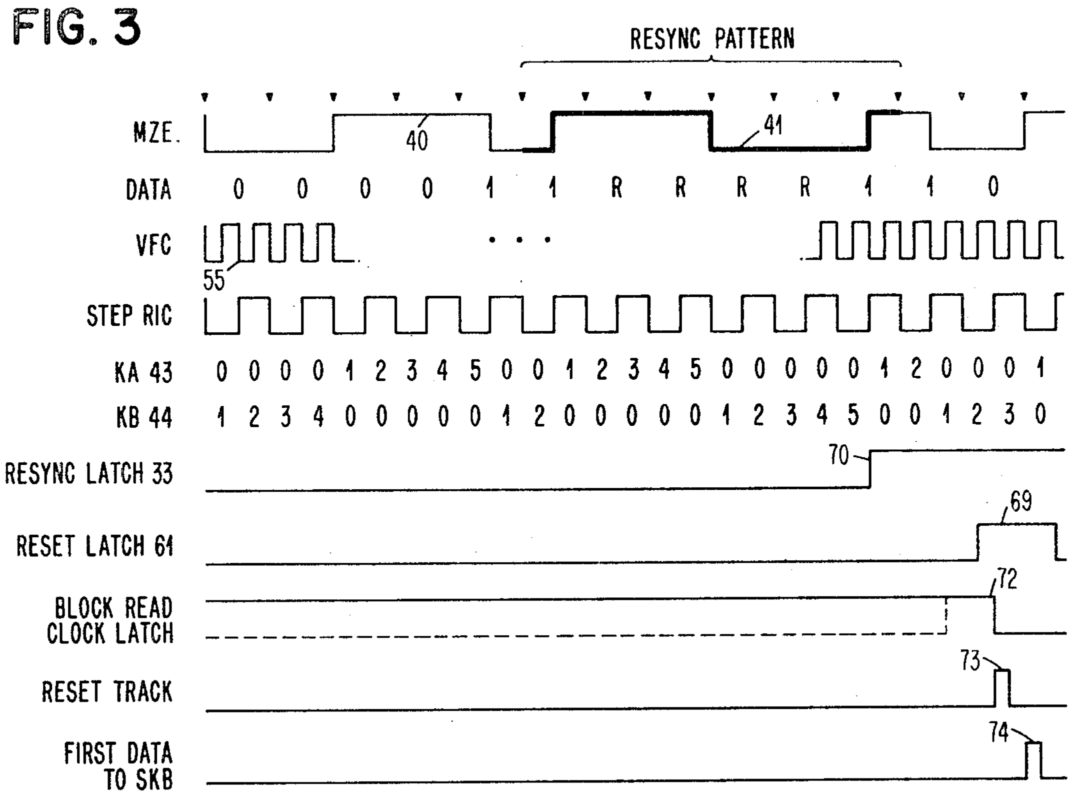
FIG. 3 is a set of idealized waveforms used to illustrate the operation of a FIG. 1 embodiment when applied to MZE recording.

We will now describe the generation of the $K$=5 signal; the "$K$=2, 3, or 4" signal; and the K=1 signal by counters 43 and 44. Referring jointly to FIGS. 1 and 3, MZE readback signal 40 is supplied to DD 21. VFC signal 55 is supplied over line 23 to WG 25. Step RIC signal 56 is generated within OTP 11 from VFC signal 55. The step RIC signal 56 defines the cells; i.e., the boundaries of the bit positions indicated by the carets at the top of FIG. 3. For proper detection of data based upon recording signal 40, there is a predetermined phase relationship between VFC signal 55, step RIC signal 56, and the readback signal peaks representing state changes in signal 40. Note that the one transitions of signal 40 must be within the center, or approximately the center, of the cell; whereas transitions at the boundary of the cells do not represent data, but are used for indicating clock times such that DD 21 can derive a clock from the readback signal. Each time, when either of the counters 43 or 44 reaches a count of $K$=1, the other counter is reset to zero with the count at that time being decoded and sent out as either a $K$=5 signal, or the "$K$=2, 3, or 4" signal. Decoding of counts is well known and is not further described for that reason. The $K$=1 count signals are supplied respectively over lines 58 and 59 for resetting the other counter. This action is shown in FIG. 3, wherein the numerical counts corresponding to MZE signal 40 are shown.

Reset latch 61 is used to terminate the resync operation. When resync latch 33 is initially set by detection of the 5—5 pattern, latch 33 supplies an enabling signal 70 to AND-circuit 62. The $K$=2 signals from counters 43 and 44 are supplied through OR-circuit 63 to AND-circuit 62. AND circuit 62 is enabled to pass $K$=2 signals only when the track is dead-tracked as indicated by the signal on line 30. Such action triggers reset latch 61 to the active condition, as shown by signal 69. Reset latch 61 then supplies an enabling signal to AND-circuit 64 which passes the track 0 step RIC pulse on line 66 to supply a track 0 activating pulse over line 68 to OTP 11 thereby enabling the data signal next received from track 0 to be inserted into SKB 14. Reset latch 61 is triggered to its inactive condition by a K–1 signal. This action occurs when either counter 43 or 44 is counting the first one-half wavelength following a resync signal. Resync latch 33 is reset by $ROC$=2 signal supplied by OTP 11 over line 38 to AND-circuit 37. $ROC$=2 signal indicates that the state of ROC is such that data signals are available in SKB 14 for transmittal to utilization means (not shown). Line 36 carries a reset signal from OTP 11 to enable resetting latch 33. Such reset signal is generated within OTP 11 in response to the line 68 reset signal. This action ensures latch 33 is not reset until after the resync signal 41 has been processed.

The signals in FIG. 3 show that track "0" is the most lagging track of the four tracks. Therefore, its RIC controls the transmission of data from SKB 14. During deadtracking, OTP 11 supplies a block read signal 72 by a latch (not shown) therein which inhibits transfer of signals from track 0 into SKB and blocks operation of RIC–0. Upon determination of track position and data phase relationships, block read signal 72 is removed by OTP 11 to then permit data to be transferred. At this time, reset track pulse 73 is supplied by AND-circuit 64 to enable data transfer from track 0 to the utilization means. The first data signal to SKB 14 is transferred at the time indicated by pulse 74 which corresponds to $RIC$=0 for track 0. At this same time, other tracks which are leading track 0 have already supplied their data signals to SKB 14. SKB 14 then transfers the first byte of data received after the resync pattern. Remember, there is one resync pattern in each of the tracks; each resync pattern is independently recognized by its respective pattern detectors. Once the position of each track is detected by detecting the resync pattern, data signals are then requeable into SKB 14, as more fully described later.

In formatting data on a tape with interleaved resynchronization patterns among data signals, it is preferred that the spacing between successively occurring resync patterns be identical throughout the record. In this regard, byte counter 12 may be used to count the bytes recorded on media 10 for ascertaining the location of a resync pattern in the respective tracks. During recording, byte counter 12 actuates circuits 39 in OTP 11 for recording the patterns as shown in FIG. 2 for the respective recording scheme. This occurs each time byte counter 12 traverses through the signal state of all zeros, for example. In the illustrated four-track system, maximum skew could be eight bit positions leading and seven bit positions lagging. This is by way of example only. In this instance, the most leading track, if it were dead, would have its resync pattern seven bit positions before all of the resync patterns in the media have been detected. Therefore, the resync pattern is looked for up to nine bit positions before it is expected that all of the resync patterns will have been detected. Decoder 13 detects when counter 12 is nine steps from zero. This value corresponds to a maximum leading skew, plus one bit position. When this value is detected by decoder 13, an activating signal is supplied to enable both AND-circuits 76 and 77 for passing the output signals of WG 25 to PD 26. In this version, counters 43 and 44 are only activated when a resync pattern is expected. This increases the reliability of the detection of the unique long duration wavelength patterns; i.e., prevents confusion with received data signals that may be in error. Decoder 13 simultaneously supplies such activating signals to all resync controls 16, 17, 18, and 19. The activating signal remains until byte counter 12 has counted eight positions into the next set of data signals. This corresponds to maximum lagging skew. This action permits a dead track resync signal to be either at the extreme leading or lagging position and yet reside within the time frame established by the activating signal.

Another recording scheme with which the present invention is easily practiced is the so-called MFE recording scheme which is illustrated in FIG. 2 by record signal 80. Again, the bit cells are represented by carets above the signal, while the data represented by the signal is listed below the signal. Resync pattern in terms of unit one-half wavelength as discussed above is a 4–3 –4 –3 or a 3–4–3–4 pattern, depending upon the direction of read. Again, the resync portion R is bracketed by binary 1 recordings to indicate the data phase relationship of the transition indicates a binary 0. A transition at the boundary of the cells indicates a state change used for self-clocking purposes. A 3–4–3–4 or 4–3–4–3 resync pattern wavelength is chosen in MFE because of the wavelength characteristics of the data. It may be noted that two cycles of state changes are utilized in the resync pattern, as opposed to the one and one-half cycles used in the MZE resync pattern. It may also be noted that, in both MZE and MFE resync wavelength patterns, the one-half wavelengths are also used to represent data. It is the sequence of selected one-half wavelengths that establishes the resync pattern. Among these are the longer ones of the wavelengths for insuring that adequate energy is provided to maximize the possibility of reliable detection of these patterns. The FIG. 1 illustrated embodiment may be used for MFE provided PD 26 is altered to detect the MFE resync pattern. In most respects, MZE and MFE are quite similar. The sequence of allowable one-half wavelengths is different by design choice.

The present invention may also be practiced with phase encoded (PE) and double frequency (FM) schemes of recording. These recording schemes are characterized by having two different one-half wavelengths: a long-duration one-half wavelength and a short duration one-half wavelength. The long one-half wavelength corresponds to time for traversing the length of one bit cell along a track, while the short one-half wavelength corresponds to traversing one-half a cell distance. In PE and FM the state change patterns look very similar, except that the location of the state changes may indicate different information. In PE, a state change in the center of a cell from positive to negative may represent a binary 0, while a state change from negative to positive in the center of a cell represents a binary 1. The reverse can also be made true. In FM, no state change within a cell period indicates a binary 0, while a state change within a binary cell represents a binary 1. Therefore, in one sense, the low-frequency components indicate a binary 0, while the higher frequency components represent a binary 1.

For purposes of the present invention, both recording schemes are considered together, with the PE scheme being discussed. It is understood that the pattern detection schemes for FM and PE can be similar. To conserve media in PE and FM, the resync pattern is made somewhat data dependent. In these two forms of recording, there is a very low overhead; that is, the area of the tape required for resynchronization is minimal. A characteristic of PE and FM in the representation of data is that successive ones of the long one-half wavelengths always have opposite polarities. That is, these long one-half wavelengths alternate between positive and negative such as seen in signal 83. Examination of these waveforms and of any available PE and FM waveforms will verify this characteristic. The resync pattern in PE and FM is defined as two successive long one-half wavelengths having the same polarity. The second one of the like polarity successive long one-half wavelengths uniquely indicates position of the track involved. The next occurring state change provides not only position information, but indicates an edge of cell, thereby establishing data phase relationship of the state changes to the data represented in the signal. The two like polarity long one-half wavelengths can be separated by a large number of short one-half wavelengths or may be adjacent.

In a preferred form of resynchronization signals for PE/FM there are two successively occurring pairs of like polarity, long-duration one-half wavelengths. FIG. 2 illustrates four combinations of the preferred resync wave patterns in heavy lines. The pattern is somewhat data dependent; that is, depending upon the data signals bracketing the resync signal, the resync pattern is somewhat different. For example, in waveform labeled PE–10, the leading data cell has a binary 1 recorded therein while the trailing data cell has a binary 0 recorded therein. In this instance, in reading from left-to-right, the first two like polarity, long-duration one-half wavelengths are indicated by numerals 84 and 85. The second set of like polarity, long-duration one-half wavelengths are indicated by numerals 86 and 87. As will be later more fully described, the two sets of like polarity, one-half wavelengths provide unambiguous resync patterns. It is possible to use just two like polarity, long-duration one-half wavelengths; however, under certain circumstances as will be fully detailed, an ambiguity may arise as to the a precise location of a resync pattern being encountered.

Waveform PE–01 indicates the resync signal when the data bracketing the resync signal are 0 and 1. Again, the heavy lines are used to denote the resync portion of the data recording waveform. Note that in both instances the long-duration one-half wavelengths bracketing the resync signal are a portion of the data signal and a portion of the resync signal. In sharing a data recording cell, the media area required for recording a resync pattern is reduced and the time for processing a resync signal is correspondingly reduced. In these two resync patterns, the center bit cell contains a long-duration one-half wavelength. The resync pattern in all instances will take five cells.

When the data pattern bracketing the resync pattern does not change, the center cell of the resync signal contains a high frequency component, as at 88 and 89 in waveforms PE–00 and PE–11. Detection of all four wavelength combinations is identical and is described with respect to FIGS. 4 and 5, which uses the PE-10 waveform for illustrative purposes.

The same general arrangement as described for pattern detector 26 in GIG. 1 is used. WG 25 receives the digital and VFC signals to supply polarity indicating pulses over lines 27*a* and 28*a* to PE/FM pattern detector PD 26*a* . PD 26*a* includes two counters 43*a* and 44*a*, which are responsive to the pulses as described for counters 43 and 44 in the FIG. 1 embodiment. In FIG. 5, data pattern PE–10. is shown together with the counts KA and KB for the measurement of the data wavelength. Each time the counters 43*a* and 44*a* reach the count of two, an output pulse is supplied, as indicated by signals 90 and 91. These K=2 pulses sample the four AND-circuits 93, 94, 95, and 96. AND-circuits 94 and 95 are used to set and reset binary trigger 98 between active and inactive conditions. When set to the active condition, trigger 98 indicates that binary 1's are to be detected; while when reset, binary 0's are to be detected. This arises from the face that there is a long wavelength associated with the change in phase. When counter 43*a*, for example, has a K=2 count, binary trigger 98 must be in the 1 state, therefore, supplying an enabling signal through AND-circuit 94. This corresponds to a 1–0 data transition. AND-circuit 94 transfers the *K*=2 signal through OR-circuit 99 to toggle trigger 98 to the reset state which represents a 0–1 data transition. At this time, AND-circuit 95 is enabled by the signal supplied through inverter 100 such that a 0 to 1 transition may be detected to toggle trigger 98 to the set state. Trigger 98 is constructed such that it has two outputs. The first output is labeled *K*=1 and is supplied over line 101 and occurs substantially simultaneously with trigger 98 changing state. The second output on line 102 is delayed by 1 clock pulse time corresponding to one-half a cell period and is indicated by KC-1*. The construction of such triggers is well known and is not further described. As data is read by the recovery circuit, trigger 98 switches state in accordance with whether 1's or 0's are to be detected. For example, if an output pulse from the detector circuit is to represent a binary 1, AND-circuit 102 is enabled by trigger 98 being set to pass negative transitions of step RIC signal 56 (FIG. 3). This corresponds to detection of a binary 1 at the trailing edge of a cell. Binary 0's can be detected in a similar manner.

Returning now to FIG. 5, detection of the resync pattern is accomplished by AND-circuits 93 and 96 responding to the signal state of trigger 98. This detection corresponds to two successive position excursions of signal 90 without an intermediate excursion of signal 91 (see heavy lines in FIG. 5). This corresponds to the detection of two like polarity successive long-duration one-half wavelengths. It is remembered that a positive long one-half wavelength corresponds to a 1 to 0 transition while a negative long-duration one-half wavelength corresponds to a 0 to 1 transition. In order to detect the resync pattern, if the circuit is detecting 1's, the last transition was a 0 to 1 transition. Therefore, indicating resync, one should look for another 0 to 1 transition (i.e., negative long-duration one-half wavelength) while detecting 1's. While detecting 0's, to detect a resync pattern, look for another positive one-half wavelength. In data signal PE–10, positive long-duration one-half wavelength 84 indicates a first 1 to 0 transition. It also happens to be a part of the resync signal. This positive long-duration one-half wavelength effects resetting trigger 98. Inverter 100 takes the reset signal on line 102 and supplies an enabling signal to AND-circuit 93 for detecting resync. The second-occurring like polarity long-duration one-half wavelength 85 is detected by counter 43*a* with the *K*=2 count signal supplied to AND-circuit 93. Since AND-circuit 93 was conditioned, it supplies an activating signal through OR circuit 104 to set binary trigger 33*a*, which corresponds to resync latch 33 of FIG. 1. When set, trigger 33*a* indicates the resync pattern has been detected.

The second two like polarity one-half wavelengths 86 and 87 are used to reset trigger 33*a* such that normal data operation may be resumed. In this regard, detection of long-duration one-half wavelength 86 conditions the circuit in the same manner as detection of long-duration one-half wavelength 84. Operation is identical with the trigger 33*a* being reset upon detection of one-half wavelength 87.

If the resync pattern consists of two negative long-duration one-half wavelengths, AND-circuit 96 is conditioned by the signal on line 102 to pass the second detected negative long-duration one-half wavelength. The signal state of trigger 33*a* is shown by signals 105 and 106. The inversion of the delayed signal as found on line 107 is signal 108. Idealized signal 109 represents the detection of two successive like polarity long wavelengths and appears at the output of OR-circuit 104. Resync latch 33*a* output signal is signal 110.

The FIG. 4 illustrated pattern detector may be used with the arrangement shown in FIG. 1 with respect to AND-circuits 76 and 77. Of course, other modifications may also be made, for example, if two sets of like polarity, long one-half wavelengths were not used, a resetting technique similar to that used for the FIG. 1 embodiment could be adopted as opposed to the binary trigger approach.

When a track is dead-tracked, the recovery of signals from that dead track is random; that is, the signals could be first recovered in the middle of a long-duration one-half wavelengths, during a record state change, or the like. It is also possible, when a dead track is being recovered, that three like polarity wavelengths may be indicated in the circuitry due to data patterns and the randomness of recovery of signals. In this regard, the second set of like polarity long one-half wavelengths in the illustrated PE/FM resync signal reset trigger 33*a* to resume normal data operation, irrespective of the initial indications. If, for some reason, a positive long one-half wavelength was detected in PE–10 waveform, one-half wavelength was detected in PE–10 waveform, one-half wavelength 85 appears as the second like polarity long one-half wavelength. the only change in PD 26*a* operation is indicated by dotted lines 112 on waveforms 109 and 110. The second pair of one-half wavelengths 86 and 87 obliterate this action to maintain a precise track position indication by one-half wavelength 87.

Also, it must be remembered that the signal state of trigger 98 with respect to the recovered signal in a dead track is random and must be resynchronized before data can be successfully detected. In this regard, the resync pattern readjusts trigger 98 with respect to the data waveforms. Counters 43*a* and 44*a* respectively measure positive and negative long one-half wavelengths. Coaction of AND-circuits 94 and 95 with these counters reestablishes data phasing.

Between two successive resync signals there may be all binary 0's or all binary 1's such that there is no intervening long one-half wavelength. In this instance, it is possible that the one-half wavelength terminating one resync pattern may be positive. Therefore, with all intervening 0's (i.e., no 0 to 1 transition), the first long-duration one-half wavelength in the succeeding resync signal would be negative. In the event that only two like polarity long-duration one-half wavelengths would be used, this may not be the case because of possible data pattern combinations For this reason, it is desirable that two sets of like polarity long one-half wavelengths be used for resync purposes. Of course, a single pair of like polarity long one-half wavelengths can be used for resync purposes.

The present invention may also be successfully practiced with the so-called synced NRZI recording system. NRZI is a recording scheme wherein a state change within a cell indicates a binary 0. In high-density recording, NRZI is not satisfactory because there is a distinct possibility of having a string of 0's. To overcome this problem, a clock transition can be inserted, as an example, every sixth cell, therefore ensuring a state change at least once every sixth cell. The detection circuits are adjusted accordingly and include a counter such that the clock transitions can be readily identified. This is all fine until a track is dead-tracked at which time it is not known which transitions are clock transitions. Of course, correlation techniques could be used to detect which transitions are clock transitions however, this involves either microprogramming a control unit or other forms of elaborate logic decision making. This invention obviates that problem and enables resynchronization within a string of data signals by introducing a resync signal having a unique set of long one-half wavelengths within the data pattern. In FIG. 2, such a resync signal is shown by signal 120. The resync signal is bracketed by each of the clock transitions and occupies two six cell intervals. The clock transition between the two intervals is omitted such that three long one-half wavelengths are provided that cannot occur in data recording. Each of the one-half wavelengths occupies four cell periods and are among the longer one-half wavelengths permissible in the synced NRZI system. The longest wavelength would be between two successive clock state change positions or six cells on the record track. There can be any number of six-cell long one-half wavelengths however, when the wavelength is reduced to four cell periods, two successive four-cell one-half wavelengths cannot occur. The length of the long-duration one-half wavelength was chosen such to minimize length of the track required for a resync signal. In this instance, it is two intervals between successive clock state-change position. By omitting the clock-state change, the three four-cell one-half wavelengths are recorded.

Figure 6:
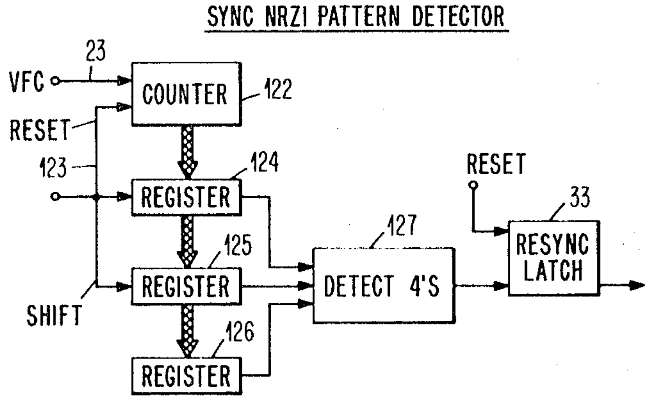
FIG. 6 shows a simplified pattern detector usable with a synced NRZI recording scheme, and which may be incorporated into the FIG. 1 embodiment.

The apparatus for recording such a series of wavelengths can be accomplished by counters with logic circuits or programs of several design choices. A pattern detector for such a series of long one-half wavelengths is shown in FIG. 6 and takes a form somewhat different than that shown for the other pattern detectors. It is understood, of course, that the other pattern detectors may be utilized by certain design modifications to detect the resync signal in waveform 120. In FIG. 6, counter 122 counts the duration of one-half wavelengths irrespective of polarity. Changes in the digital signal on line 123 reset counter 122 and simultaneously transfer the contents thereof to register 124. The VFC signal is supplied to counter 122 from line 23. Three registers 124, 125, and 126 are memory for indicating durations of three successive one-half wavelengths. These three registers supply their output signals to "fours" detector 127. When all three registers 124–126 contain indications of four-cell duration one-half wavelengths, detector 127 is activated to set resync latch 33. Operation then proceeds as described for the FIG. 1 illustrated embodiment.

The requeuing of readback signals from a dead track into SKB 14 will now be described with respect to FIG. 7. FIG. 7 is to be read in context with the Floros patent supra, which shows a deskewing apparatus usable as SKB 14. Track 0, represented by RIC–0, is a dead track, as indicated by the *x*'s and is also the most lagging track. Of the three initially all active tracks, track 2 and 3 are lagging track 1, as indicated by the numbers corresponding to the RIC's. The readout counter, ROC, steps with the most lagging tracks. Initially, it steps with RIC 2 and RIC 3. The numbers in the rows corresponding to RIC 0–3 and ROC represent the numerical state of the counters and correspond to registers in the Floros deskewing apparatus. When *ROC*=4, register No. 4 has been read out. Correspondingly, when RIC 1=5, the signal from track 1 is inserted into the appropriate digit position of deskewing register 5. When all of the RIC's have counted past a given state, ROC follows that state. Accordingly, ROC always follows the most lagging RIC. This can be easily ascertained from an inspection of FIG. 7.

When the ROC count equals 3 and byte counter 12 has counted to a predetermined number, the AND-circuits 76 and 77 of FIG. 1 are activated to enable detection of a resync pattern. This occurs at the maximum leading position or seven bit cells ahead of the ROC count. This is indicated in FIG. 7 as the resync period maximum leading position. As the ROC counts to 7, it is held up by a latch (not shown) in OTP 11 such that it remains at the 0 state until data is again ready to be read out. For purposes of simplicity, the RIC's count during the resync pattern designated in FIG. 7 by the heavy R's. Therefore, the resync pattern is started at the count of $RIC=4$ for each of the respective tracks. At the end of the resync pattern, each of the RIC's will have a 0 state corresponding to the first data signal to be read after the resync pattern.

In the case of dead track 0, the resync pattern is detected and its RIC is preset to the zero state at the termination of the resync pattern, as by the output of AND-circuit 64 of FIG. 1. If track 0 circuits have been successfully resynchronized at this time, the resync pattern has precisely indicated present track position of track 0 with respect to the other tracks such that data can then be read into SKB 14. Track 0 circuits supply a digital signal to register 0 of SKB 14. The ROC causes read out of SKB 14 register 0 When RIC 0 steps to position 1, ROC follows by stepping to position 1, etc. Track 0 has been requeued into SKB 14.

In the event that the dead track is leading, it supplies signals to SKB 14 track 0 bit position before tracks 2 or 3. When track 2 or 3 reaches the 0 numerical state, ROC continues to count without pause. It is understood, of course, that when ROC counts 4 through 7 during the resync period transfer of data from OTP 11 is inhibited.

It is possible that dead track 0 may not be successfully resynchronized, even though the resync pattern during periods 4 through 7 are sensed. In this regard, there is a maximum lagging condition at which time the track 0 will continue to be deadtracked. This is determined by the relationship between the most leading track and the present dead track. In the FIG. 7 illustration, RIC 1 represents the most leading track. When it reaches a count of 6 and SKB 14 has received no data signals from track 0, track 0 must be again deadtracked, SKB 14 continues to read out signals from tracks 1 through 3. The apparatus and method for accomplishing the latter function are the same as when track 0 is initially deadtracked and is not described for that reason.

While the invention has been particularly shown and described with reference to preferred embodiments thereof, it will be understood by those skilled in the art that various changes in form and details may be made therein without departing from the spirit and scope of the invention.

What is claimed is:

1. A recording system of the moving record media type having a plurality of record tracks for containing recorded digital signals with at least first and second duration one-half wavelengths between successive record state changes, second duration being substantially longer than the first duration, each track being divisible into bit cells such that the phase and one-half wavelength sequences with respect to said cells represent information, means for recording signals on and means for sensing signals from said record media, said sensing means having dead-tracking capabilities, and supplying a readback signal, and including self-clocking digital detecting means and deskewing means, the improvement including the combination:

first means operative with said recording means to interrupt recording of data representing digital signals to record a resync signal identifying an exact position on the respective tracks within said recorded data signals, each said resync signal including a plurality of said second one-half wavelengths in a pattern unique to said resync signal, all one-half wavelengths used to record said resync signal also being usable to record data signals, second means operative with said sensing means and being responsive to said unique pattern of second one-half wavelengths for indicating that a resync signal has been detected and simultaneously indicating for each track a predetermined track position such that the next sensed digital signal from each track is supplied to said deskewing apparatus at a predetermined position therein, said self-tracking means operative to frequency synchronize its operation on any said signals sensed from said media.

2. Apparatus as set forth in claim 1 wherein said recording system further uses a third duration one-half wavelength intermediate in duration between said first and second one-half wavelengths for representing data, with data being representable by sequences of said three one-half wavelengths, and said first means being further operative to record, and said second means includes wavelength means for measuring all one-half wavelengths and being responsive to any two successive ones of said second one-half wavelengths to indicate a resync signal.

3. Apparatus as set forth in claim 1 wherein said recording means and said sensing means are operative to indicate a first binary state when a change in record state occurs, a change in record state being caused by said recording means every short interval of recording irrespective of data being recorded, the improvement further including said recording means being operative to record a resync signal as first a plurality of second one-half wavelengths while omitting one of said periodically recorded state changes such that three one-half wavelengths occur during two of said short intervals, said second means including:

wavelength means for measuring and indicating duration of said one-half wavelengths as received from said media, memory means responsive to said wavelength means for storing indications of a first plurality of last-sensed recorded one-half wavelengths, and detector means responsive to said stored indications showing said first plurality of second one-half wavelengths to indicate a resync pattern has been detected.

4. Apparatus as set forth in claim 1 wherein said recording means is operative to record a symmetrical resync signal such that the readback waveform, when read in either direction of relative media movement, contains signal components indicating like signal characteristics of the signal waveform, and said second means including a wavelength operative in an identical manner in either direction of readback.

5. The apparatus as set forth in claim 4 wherein said recording system records data signals having first duration one-half wavelengths equal to one-half a bit cell and second duration one-half wavelengths equal to a bit cell, the improvement further including said first means being operative to record two like polarity second duration one-half wavelengths separated only by said first duration one-half wavelengths as said resync signal and to record said second duration one-half wavelengths in data as alternating polarity one-half wavelengths and, wherein at least one of said resync like polarity second-duration one-half wavelengths extends into a bit cell recording data signal state change, said second means further including:

memory means having at least two stable states, wavelength measuring means responsive to said second duration one-half wavelengths of first and second polarities to set said memory means to first and second states, respectively, and to supply control signals indicative of the polarity of said second duration one-half wavelengths, and comparison means jointly responsive to said memory means being in said first or second state and said control signals indicating a corresponding polarity second duration one-half wavelength to supply said indication of said resync signal.

6. The apparatus as set forth in claim 5 wherein said first means is operative to interrupt said recording means for recording a resync pattern having two pair of like polarity second duration one-half wavelengths separated by a phase adjusting signal and wherein one of said second one-half wavelengths in each pair extends into a bit cell recording data, and said second means further including reset means responsive to a second encountered pair of like polarity second duration one-half wavelengths to indicate end of said resync signal as a precise longitudinal location on said track and to indicate bit cell locations with respect to said readback signal.

7. A reproducing system for digital signals recorded in a track on a record media, said digital signals including data representing signals having a plurality of different duration one-half wavelengths including relatively long duration one-half wavelengths and having unique patterns of said long duration one-half wavelengths intermingled among said data representing signals for use as a resync signal to indicate a unique location within said track, the improvement including in combination:

sensing means for supplying a readback signal representative of signals recorded in said track as sensed by said means, one-half wavelength measuring means receiving said readback signal and indicating durations of one-half wavelengths represented in said readback signal for a given plurality of last received ones of said one-half wavelengths, resync detecting means receiving said indications and being responsive to said unique sequence of said long-duration one-half wavelengths to indicate a resync signal, and function means responsive to said last occuring long-duration one-half wavelengths and to said resync signal indication to perform a function for enabling determination of the informational content of data representing signals received subsequent to said resync signal.

8. Apparatus as set forth in claim 7 wherein said reproducing system for said track includes self-clocking means supplying VFC signals usable to identify bit cells along the length of said track, said VFC signals being derived from said readback signal, the improvement further including in combination:

said wavelength measuring means including counting means jointly responsive to said VFC signals and to said readback signals for counting said VFC signals during first and second polarity indications of recorded signals by said readback signals for determining durations of such one-half wavelengths, and said resync detecting means further including:

multistate memory means responsive to said counting means to indicate a predetermined number of said counts such that a plurality of said measured long one-half wavelengths can be examined, comparison means jointly responsive to said memory means indication and a predetermined count from said counting means to indicate a resync pattern has been detected and for actuating said function means when said resync signal has been detected.

9. Apparatus as set forth in claim 8 wherein said reproducing system includes a plurality of parallel record tracks subject to skew and deskewing apparatus (SKB) having a given number of deskewing positions and being steppable through said positions as signals are read back from said record media and with one of said positions being a reference position, the improvement further including in combination:

said function means operative jointly with said SKB to cause read-in to said reference position from said track upon the performance of said function, whereby signals from said track are requeued in said SKB with signals from other tracks on said record media.

10. Apparatus as set forth in claim 8 wherein said multistate memory means is a two-state binary trigger and said comparator means is an AND circuit conditioned for operation by said trigger being in an active state, said memory means being responsive to said counter means indicating that a first long-duration wavelength has been detected to be in said active state, and said counter means resetting said memory means each time a one-half wavelength is measured that is not one of said long-duration one-half wavelengths.

11. Apparatus as set forth in claim 8 wherein said counting means include means for indicating a plurality one-half wavelengths being counted and further responsive to said readback signal receiving a second one of said long duration one-half wavelengths to reset said memory means, said memory means including two-state means responsive to said counting means indicating a first polarity long-duration one-half wavelength for being in an active state, said comparison means being AND circuit means responsive to said memory means being in said active state to be conditioned for passing an indicating signal, said counter means upon detection of a second one of said first polarity long duration one-half wavelengths without intervening opposite polarity long duration one-half wavelengths to supply an indicating signal to said AND circuit means for indicating a resync signal has been detected.

12. Apparatus as set forth in claim 11 wherein said reproducing system has dead-tracking capabilities and supplies a dead-tracking indicating signal, the improvement further including in combination:

reset latch means being jointly responsive to said dead-track indicating signal, a resync pattern being detected, and said counting means counting one of said long-duration one-half wavelengths, irrespective of polarity, to be in an active condition, said reset latch means being electrically interposed between said function performing means and said means supplying said resync indicating signal, deskew counting means for counting signals recovered from said record track, resync termination means jointly responsive to said reset latch means being in an active condition and to said deskew counting means to supply a signal indicating end of resync.

13. Apparatus as set forth in claim 12 wherein said resync signal is recorded as two pairs of like polarity long one-half wavelengths, said resync termination means being responsive to a first encountered one of said pairs to be conditioned for terminating resync and further responsive to a second encountered one of said pairs to supply said signal indicating end of resync.

14. Apparatus for recovering signals recorded in a track on a movable record media, the recorded signal having sequences of record state changes representing data, different duration one-half wavelengths separating said changes, two successive one-half wavelengths of opposite polarity constituting one cycle of two changes, means for sensing said recorded signals and supplying a readback signal indicative thereof, means for measuring said one-half wavelengths and indicating relative durations thereof, means responsive to a predetermined sequence of longer ones of said one-half wavelengths not exceeding two cycles thereof to supply a track position indicating signal, and means responsive to said indicating signal and to said readback signal to establish a predetermined sequence of data interpretations for said readback signal.

15. Data record means having moving media, self-clocking means having a plurality of record tracks for storing digital signals of given durations of one-half wavelengths according to given recording scheme, circuits for handling said digital signals during recording and readback operations, the improvement including the combination:

resync means for establishing track position indications including means to effect recording and reproduction of a resync signal recorded in a given record track, wavelength means in said resync means operative only with said given durations of one-half wavelengths for determining said resync signal including means for measuring longer ones of said one-half wavelengths and supplying indications thereof, multistate memory means in said resync means and being responsive to said wavelength means to store a given plurality of said indications for last measured ones of said one-half wavelengths, comparison means in said resync means receiving said stored indications and being responsive to a stored pattern of said indications to supply a control signal to said storage means that said given track has a predetermined position, said storage means being responsive to said control signal to adjust its operation such that signals recorded on said media and being handled by said circuits have a predetermined relationship after receipt of said control signal irrespective of the relationship before receipt of said control signal.

16. Data record means as set forth in claim 15 wherein said wavelength means also indicates data values for said measured one-half wavelengths and operative to indicate both a data value and a resync pattern for a given one of said one-half wavelength each time a resync signal is detected.

17. The method of unambiguously indicating a record track position and data phase of a digital signal recorded in said record track as a succession of record state changes, recording a unique pattern among and contiguous with recorded digital signals used to represent stored information, said digital signals having a given range of one-half wavelengths and said pattern including a plurality of longer ones of said one-half wavelengths, each one-half wavelength being between two said successive record state changes, detecting each said unique patterns and indicating at the end of said patterns a given track position with respect to a given one of said record state changes within said unique pattern and interpreting same as having a predetermined phase relationship with said digital signals, and detecting said digital signals and interpreting same in accordance with said given one record state change.

18. For a recording system having a serial transfer of signals between a record media and data means, said signals representing data in the time domain in accordance with a succession of signal-state changes separated by one-half wavelengths of various durations, given durations of said one-half wavelengths representing predetermined units of information with respect to data represented by said succession of signal-state changes;

the combination including:

resync means selecting ones of said given duration one-half wavelengths and combining same with additional one-half wavelengths of said given duration to interleave a unique set of said given duration one-half wavelengths amongst data signals to indicate a resync location such that said selected one-half wavelengths represent both predetermined units of information and said resync locations; and said data means responsive to said selected one-half wavelengths and said succession of signal-state changes to indicate data and responsive to said resync means in accordance with said unique set including said selected one-half wavelength to establish a data-indicating relationship to a later-received succession of signal changes including one of those signal changes partially defining one of said selected one-half wavelengths.

19. A resynchronizable recording system having an operatively associated transducer and record track scanned by such transducer for effecting recording and reproducing of signals with respect to said track, such signals including successive changes of record signal states separated by a set of various length one-half wavelengths with data content indicated by relationships of said changes with respect to regularly recurring record cells in said record track defined in the time domain as bit periods, the improvement including the combination:

resync means operative with respect to a longer first one of said one-half wavelengths and capable of supplying resync-indicating signals with respect to a unique succession of said first one-half wavelengths, data means for exchanging data signals, recording system means electrically coupled to said transducer for exchanging signals therewith and electrically coupled to said data means for exchanging data signals therewith in coordinated circuit operation with said transducer and responsive to said resync-indicating signals to interrupt exchange of signals with said data means but not said transducer and further being responsive to such resync-indicating signal to establish a predetermined data-indicating relation to signals subsequently exchanged with said transducer, and said resync means and said data means each independently responsive to one signal change having a predetermined relation to said unique succession respectively to supply said resync-indicating signal and said data-indicating signals.

* * * * *